US007551859B2

(12) United States Patent
Miller et al.

(10) Patent No.: US 7,551,859 B2
(45) Date of Patent: Jun. 23, 2009

(54) MULTIPLE REGION PRINTER CHIP

(76) Inventors: Steven Miller, 10166 66th St. North, Pinellas Park, FL (US) 33782; Herman Schnell, P.O. Box 670397, Coral Springs, FL (US) 33067

( * ) Notice: Subject to any disclaimer, the term of this patent is extended or adjusted under 35 U.S.C. 154(b) by 126 days.

(21) Appl. No.: 11/614,279

(22) Filed: Dec. 21, 2006

(65) Prior Publication Data

US 2007/0127936 A1 Jun. 7, 2007

Related U.S. Application Data

(63) Continuation-in-part of application No. 11/162,878, filed on Sep. 27, 2005, now Pat. No. 7,286,774, and a continuation-in-part of application No. 11/334,980, filed on Jan. 19, 2006, now Pat. No. 7,187,874.

(51) Int. Cl.
*G03G 15/00* (2006.01)
*B41J 29/393* (2006.01)
*B41J 2/41* (2006.01)
*G01D 15/28* (2006.01)

(52) U.S. Cl. .......................... 399/12; 399/24; 399/109; 399/110; 347/19; 347/152

(58) Field of Classification Search ................ 399/109, 399/12, 13, 24, 25, 107, 110, 111; 347/19, 347/20, 49, 84, 152
See application file for complete search history.

(56) References Cited

U.S. PATENT DOCUMENTS 5,579,088 A * 11/1996 Ko .............................. 399/12
6,016,409 A * 1/2000 Beard et al. ............. 399/110 X
6,104,888 A 8/2000 Kobayashi
6,263,170 B1 7/2001 Bortnem
6,385,407 B1 * 5/2002 Inose .......................... 399/24
6,529,691 B2 3/2003 Guy et al.
6,539,867 B2 * 4/2003 Lee ............................ 399/12
6,701,096 B2 3/2004 Arai et al.
6,940,613 B1 * 9/2005 Beard et al. ............... 399/12 X
7,088,928 B2 * 8/2006 Burchette et al. ............ 399/12
7,099,606 B2 * 8/2006 Karagiannis et al. ........ 399/109
7,221,878 B2 * 5/2007 Chen ........................... 399/12
7,232,209 B2 * 6/2007 Asauchi ....................... 399/12
7,254,346 B2 * 8/2007 Burchette et al. ............ 399/12

* cited by examiner

*Primary Examiner*—Sandra L Brase
(74) *Attorney, Agent, or Firm*—Thomas E. Toner; Jesse E. Delcamp

(57) ABSTRACT

A toner cartridge having a microcontroller configured to store data necessary to create a message authentication code required by the printer. The microcontroller contains data values capable of generating acceptable MACs for a plurality of printers used in a plurality of geographic regions. The microcontroller recognizes a variety of unique parameters displayed by the printer's processor to identify the geographic region of the printer being used. Once the printer and geographic region are identified, the microcontroller loads the data values associated with the printer and generates an acceptable MAC to enable printer operation.

28 Claims, 6 Drawing Sheets

MULTIPLE REGION PRINTER CHIP

CROSS REFERENCE TO RELATED APPLICATIONS

This application is a Continuation-in-Part of co-pending U.S. patent application Ser. No. 11/162,878, filed Sep. 27, 2005 and U.S. patent application Ser. No. 11/334,980 filed Jan. 9, 2006, which are fully incorporated herein by reference.

BACKGROUND OF THE INVENTION

The present invention relates to a toner cartridge adapted to fit within a toner cartridge-receiving cavity of a printer.

Laser printers use a coherent beam of light, hence the term "laser printer," to expose discrete portions of an image transfer drum thus attracting the printing toner. Toner is a mixture of pigment (most commonly black) and plastic particles. The toner becomes electro-statically attracted to exposed portions of the photoconductive transfer drum.

The photoconductive drum rotates opposite the developer roller, the developer roller being in fluid contact with the toner. The toner is transferred to paper, or other medium, as it passes over the rotating image transfer drum. Subsequently, the paper is heated so that the plastic is melted thereby permanently affixing the ink to the paper.

Most printer manufacturers design their printers to accept toner cartridges manufactured by it and to reject the toner cartridges manufactured by others. More particularly, to increase sales of their own toner cartridges, printer manufacturers have added electronic identification features to the printers and to the toner cartridges that do not enhance the functional performance of the printer in any way but which serve to prevent use of a competitor's toner cartridge in the printer. Printer manufacturers also prefer to sell new toner cartridges to replace empty toner cartridges. Therefore, they do not support the re-cycling industry.

Regional lockout is the programming practice, code, chip, or physical barrier used to prevent the playing of media designed for a device from the country where it is marketed on the version of the same device marketed in another country. It is a form of vendor lock-in control. Regional lockout usually uses manufacturer-specific hardware that is instructed to operate only with consumables designated for a particular region, and that region is then encoded onto the consumable.

Manufacturers utilize regional lockout to segment the world into different regions, and then only sell a particular region's model (and, of course, region-encoded media) in that area. As a result, makers and distributors of electronic devices are able to gouge consumers by charging more in some regions than they do in others. Consumers are harmed because an inexpensive device made in one region cannot, in theory, be used in a more expensive market.

Thus there is a need for a universal printer chip that enables a single toner cartridge to be used with printers made by differing manufacturers, with differing printer's models made by a common manufacturer. There is also a need to extend the universality of the chip to allow the manufacture of a single cartridge that can be used in multiple geographic regions. In addition to new cartridges, such a universal printer chip could be used in conjunction with spent cartridges that are re-filled with toner when empty by the re-cycling industry.

SUMMARY OF INVENTION

The long-standing but heretofore unfulfilled need for a toner cartridge that enables a single toner cartridge to be used with printers made by differing manufacturers and with differing printers models made by a common manufacturer, and which also includes other improvements that overcome the limitations of prior art toner cartridges is now met by a new, useful, and non-obvious invention.

In one embodiment, the present invention provides a method of communicating a message authentication code for a toner cartridge to a printer, such as a printer, having a processor containing a lock-out algorithm. A toner cartridge equipped with a microcontroller engages in bidirectional communication with the processor of the printer when the cartridge is installed in the toner cartridge-receiving cavity of the printer. A look-up table containing a cross-reference of processor-command algorithms, identified by a distinct communication pattern, corresponding to various geographic regions is stored on the microcontroller.

The printer firmware on the processor communicates a command, or series of commands, to the microcontroller to verify the toner cartridge is an authorized component. The sequence of commands from the processor forms a communication pattern recognized by the microcontroller. The communication pattern originated by the processor matches a corresponding communication pattern on the look-up table which provides the identity of the geographic region in question.

The firmware on the microcontroller recognizes the identity of the printer and generates a suitable Message Authentication Code (MAC). The MAC is transmitted to the processor, thereby establishing the electronic "handshake" necessary to enable operation of the printer.

In one embodiment, the microcontroller is capable of storing at least one data value associated with a toner cartridge status parameter on the microcontroller. A status parameter can be any value or characteristic of the cartridge, including those unique to the microcontroller, requested by the printer. In alternate embodiments, the MAC is generated using different data values stored on the microcontroller. Although multiple algorithms can be used to generate the MAC, one embodiment employs a Secure Hash Algorithm (SHA-1).

Examples of data values used to calculate the MAC include, but are not limited to a serial number associated with the microcontroller, a secret code, or a ROM ID. Moreover, a data value can be used to communicate parameters such as toner volume, page yield, or the like. In another embodiment, the MAC is generated using at least one data value stored on the microcontroller and a challenge code initiated by the processor. Although the mode of communication between the microcontroller and the processor can vary, one embodiment uses communication established through a single wire bus architecture protocol.

It may occur that two or more printers share similar communication patterns. If the microcontroller communicates the wrong MAC, the processor will generate an error code. In this embodiment, the microcontroller is capable of generating a second, or more, MACs responsive to the error code. Subsequent MACs are transmitted to the processor by re-initializing the apparatus startup routine; by opening and closing the lid on a printer for example.

Alternate embodiments utilize other information sent by the processor to identify the printer. For example, one embodiment employs a microcontroller capable of detecting the different communication timings of the data signals. Different printers use different processors which in turn operate at different speeds. A look-up table is established to identify the correct geographic region as described above.

In yet another embodiment, a microcontroller capable of detecting the different voltage levels. As with the previous embodiment, different regions use different processors which produce different voltage values over time. A look-up table is established to identify the correct geographic region as with the previous embodiments.

Another embodiment establishes interoperation between the toner cartridge and printers used in a plurality of geographic regions without the use of lookup tables. In this embodiment, the microcontroller on the cartridge is associated with an authentication code that is operable in multiple regions. In this embodiment, it is not necessary for the microcontroller to detect the geographic region of the printer. The universal authentication code is communicated regardless of the geographic region.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
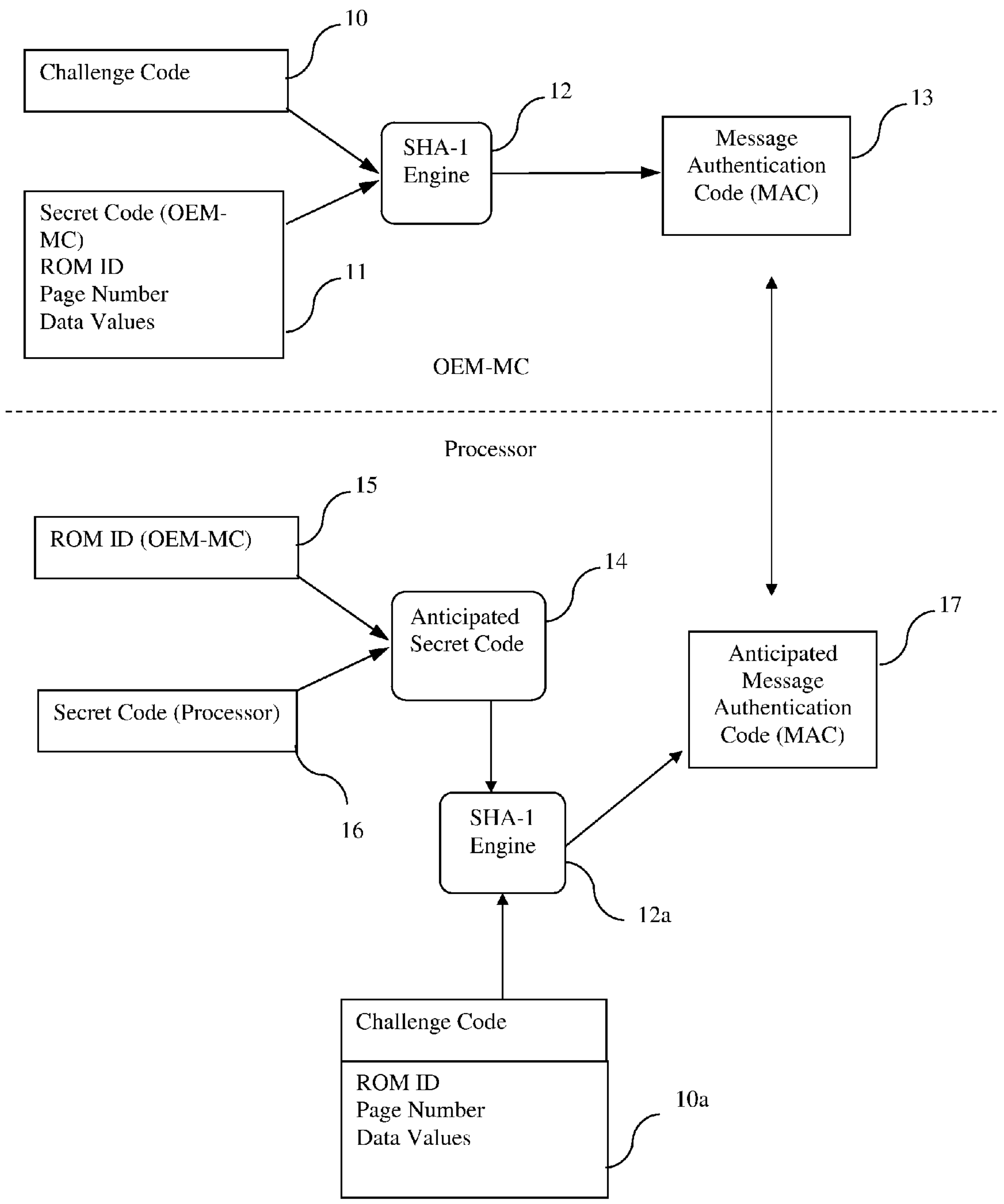
FIG. 1 is block diagram representing the challenge-and-response protocol employed by many OEM manufactures.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Terms

As used herein, the term "processor" refers to any portion of a printer that interprets, carries out, or processes, instructions or data contained in the software or firmare contained therein.

As used herein, the term "printer" refers to any image forming apparatus that accepts the use of a toner cartridge. Examples include, but are not limited to, printers or copying machines or other electro-photographic devices.

As used herein, the term "microcontroller" is any system, device, or execution unit with added functionality capable of implementing the method as described. Accordingly, the "microcontroller" must be capable of storing information, receiving signals originated from an outside source, and transmitting signals to an outside source. Although it is preferred, it is not necessary that the "microcontroller" be implemented on a single monolithic integrated circuit.

As used herein, the term "communication pattern" is any communication, command, request, or data value originated by a processor. A "communication pattern" can be established by any number of communications, commands, requests, or data values including the lack thereof.

OEM Toner Cartridge Authentication

Some printers, such as the LEXMARK® T420, T420, T520, T522, T620, T622, T630, T632, T634, T640, T642, T644, E320, E321 Laser printers and their derivatives for example, contain firmware designed to enforce so-called "Pre-Bate" licenses. Toner cartridges equipped with Original Equipment Manufacturer printer chips (OEM-PCs), like the DS2432 manufactured by DALLAS SEMICONDUCTOR®, are coupled with one-wire bus technology to lock-out non-OEM toner cartridges. These OEM-PCs use a 512-bit-SHA-1 (Secure Hash Algorithm) engine to generate a 160-bit Message Authentication Code (MAC) for each page of data stored on the OEM-PC.

Data stored on any data page can include information value that may be requested by a processor on the printer during operation. Examples include the serial number of the cartridge, the yield, toner levels, model type, etc. When the processor requests information from a data page on the OEM-PC, the SHA-1 engines generates a MAC using stored data values such as the OEM-PC's unique ROM ID, the data on the requested page, and/or a "secret" code stored on the OEM-PC. Systems with higher security also incorporate a "challenge code" issued by the processor prior to requesting the page at issue. Hence, an OEM toner cartridge can be limited to use in a single printer by providing a data value on the OEM-PC that it is only capable of generating an acceptable MAC for that printer model.

FIG. 1 shows how the authentication MAC is constructed. Upon activation of the OEM-PC, the processor issues a challenge code 10 to the OEM-PC. Challenge code 10 is combined with data values associated with a toner cartridge status parameter stored on the OEM-PC 11. Challenge code 10 and data values 11 are processed by the in-circuit SHA-1 engine 12 to generate MAC 13.

The processor computes an anticipated MAC 17 using an anticipated OEM-PC secret 14. Anticipated OEM-PC secret 14 is created by combining a master secret 16 contained within the processor and the ROM ID of the OEM-PC 15. The processor uses the same information used by the OEM-PC 10*a* to calculate anticipated MAC 17 through a SHA-1 engine 12*a* on the processor. If the MAC generated by the OEM-PC does not match the anticipated MAC, an error code is generated.

Universal Printer Chip Authentication-Regional Identification

The inventive method incorporates a microcontroller that emulates an OEM-PC and is able to transmit the necessary data to communicate with the printer being used. By way of example, a microcontroller of the Texas Instruments MSP430 family could be implemented although other microcontrollers could also be used. Microcontrollers of the MSP430 family are useful, as this family of microcontrollers possess analog-to-digital conversion capabilities that are highly configurable and can run largely free of program involvement.

A microcontroller, such as the MSP430 can be modified to emulate an OEM-PC and communicate with a printer, notwithstanding the one-wire lock-out protocol. OEM-PC commands are emulated by installing a firmware program that makes the microcontroller operate in the same fashion as the OEM-PC. The firmware emulation step is completed by storing the correct data values in the microcontroller.

The firmware emulation step being complete, the next step is to make the toner cartridge equipped with the microcontroller functional in multiple regions without needing to load new values for each region or replacing the printer chip in the cartridge. Accordingly, the inventors provide a method of detecting in which geographic region the printer is being utilized by allowing the microcontroller to recognize a parameter unique to printers in a given geographic. Identification can be achieved by having the microcontroller recognize different communication patterns, different communication timing on the data signals, and/or different voltage levels at the data connections.

Communication-Pattern Identification

All printers are equipped with software that controls the printer engine and printer controller. This firmware on the processor controls the operation of the printer and determines what commands/requests are sent to the microcontroller and in what order. Accordingly, printers in different geographic areas are controlled by different firmware, presumably written by different authors, and different hardware. It is therefore possible to establish a look-up table cross-referencing a plurality of known communication patterns with various geographic regions.

EXAMPLE 1

The processor for a printer used in geographic region A recognizes a start-up event (such as closing the printer-door); the processor then searches for the microcontroller on the toner cartridge. Once detected, the printer sends a request to the microcontroller for the data in memory location 20*h*, then a request for the data in memory location 30*h*, and finally a request for the data in memory location 00*h*. In contrast, when the firmware for a printer in geographic region B recognizes a start-up event it sends a read-request to memory location 00*h*, followed by 20*h*, and finally location 30*h*. Printers in region C initiate contact with a read request for memory location 30*h*.

Figure 2:
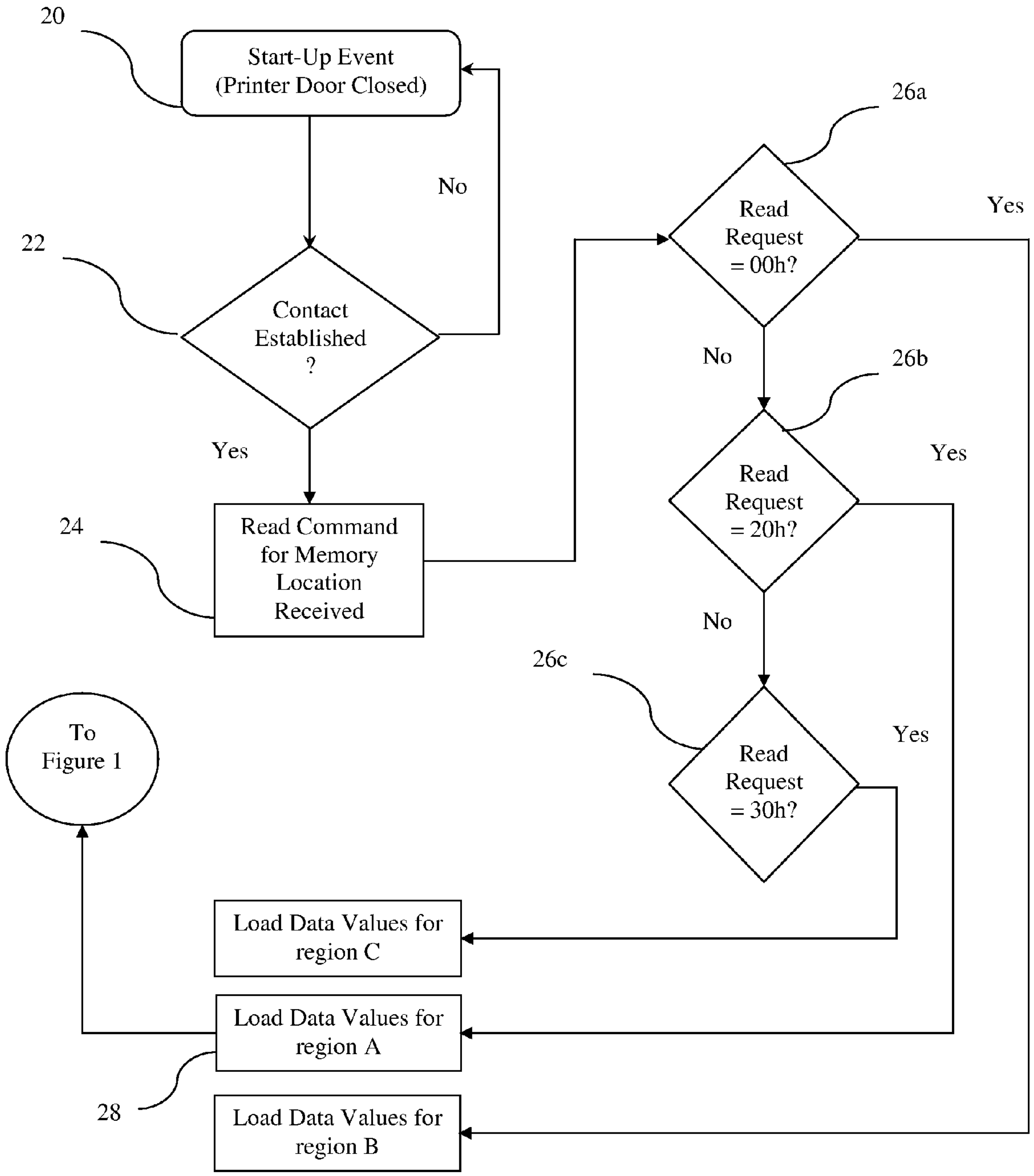
FIG. 2 is a simplified block diagram of a general embodiment of the present invention wherein the microcontroller monitors the communication pattern of the processor to identify the geographic region.

FIG. 2 illustrates the program flow of a preferred embodiment. After start-up event 20, the processor establishes bidirectional communication with the universal microcontroller 22. The microcontroller will then wait for a read command from the processor. Upon receiving the read command 24 for memory location 20*h* first, microcontroller will compare the request against the look-up table 26*a-c*. In this example, printers in geographic region A are the only printers that initiate communication with a read command for memory location 20*h* (26*b*). The microcontroller recognizes the host printer as one in region A and loads the data values associated therewith 28. With the proper data values 28 loaded, the microcontroller can calculate a MAC that will match with the MAC calculated by the processor (FIG. 1).

EXAMPLE 2

It is possible for printers in more than one geographic region to use the same communication pattern to read memory locations on a microcontroller. The present invention provides a toggle-identification system to provide multiple data values for use in MAC generation, responsive to duplicate communication patterns.

Figure 3:
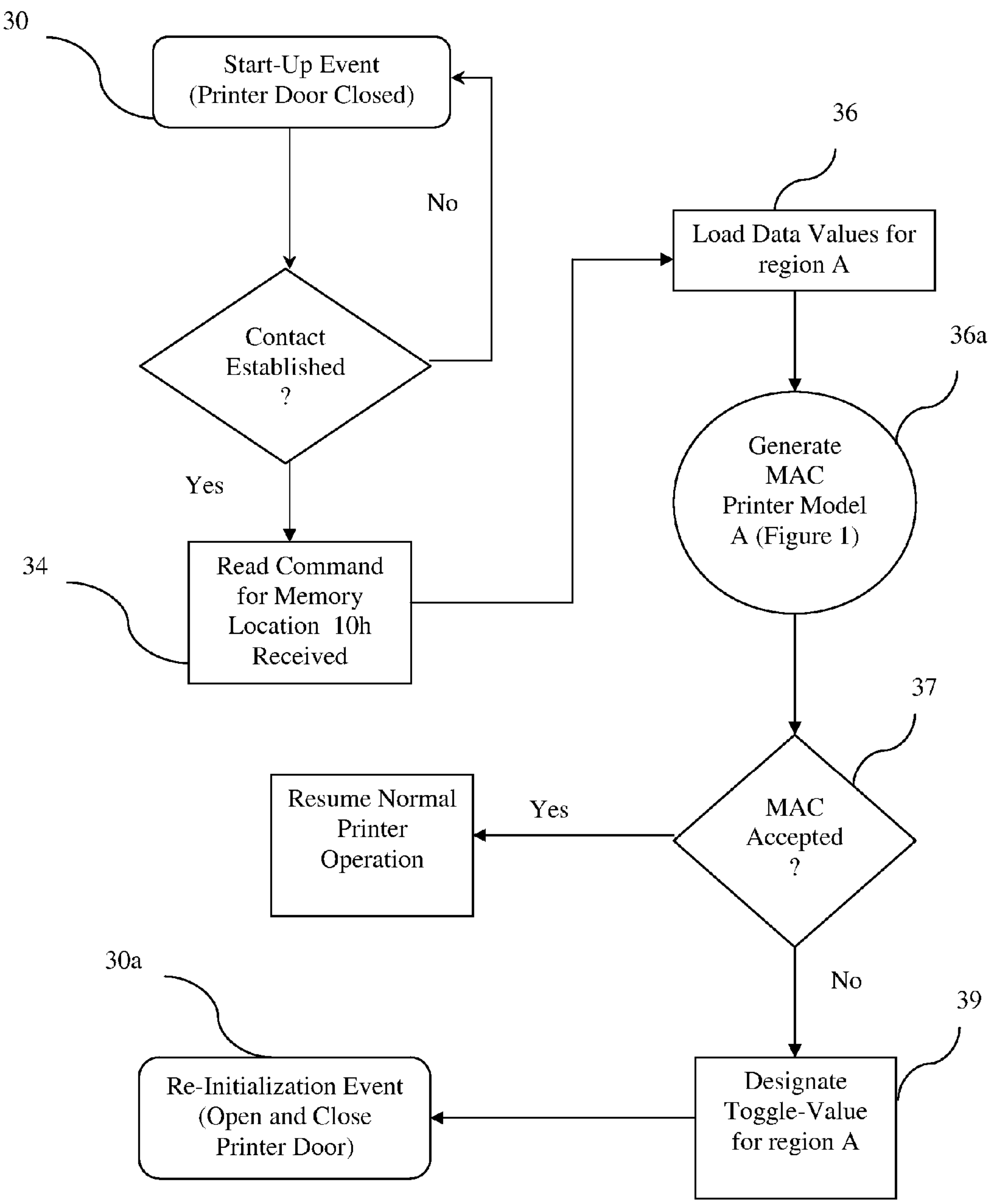
FIG. 3 is a simplified block diagram of a first toggle-identification subroutine of a preferred embodiment wherein printers used in multiple geographic regions have similar communication patterns.

FIG. 3 illustrates the first toggle-identification subroutine of a preferred embodiment. When the processor of printers in both geographic region A and B recognize a start-up event 30 they send an identical read-request 34: first to memory location 00*h*, followed by 20*h*, and finally location 30*h*. Assuming the cartridge was installed in a printer in region B, the microcontroller would not be able to positively recognize the printer. Upon receiving the read-request for memory location 00*h* the microcontroller accesses the look-up table and identifies the printer as one in region A 36. When the microcontroller generates a MAC using the data values stored for region A 36*a*, the printer generates a conflicting MAC and rejects the cartridge (i.e. "32 Unsupported Print Cartridge" message) 37. Having received an error code, the microcontroller stores a data value that initiates the toggle mechanism 39. Responsive to the error code, the user re-initializes start-up (presumably by opening and closing the printer door) 30*a*.

Figure 4:
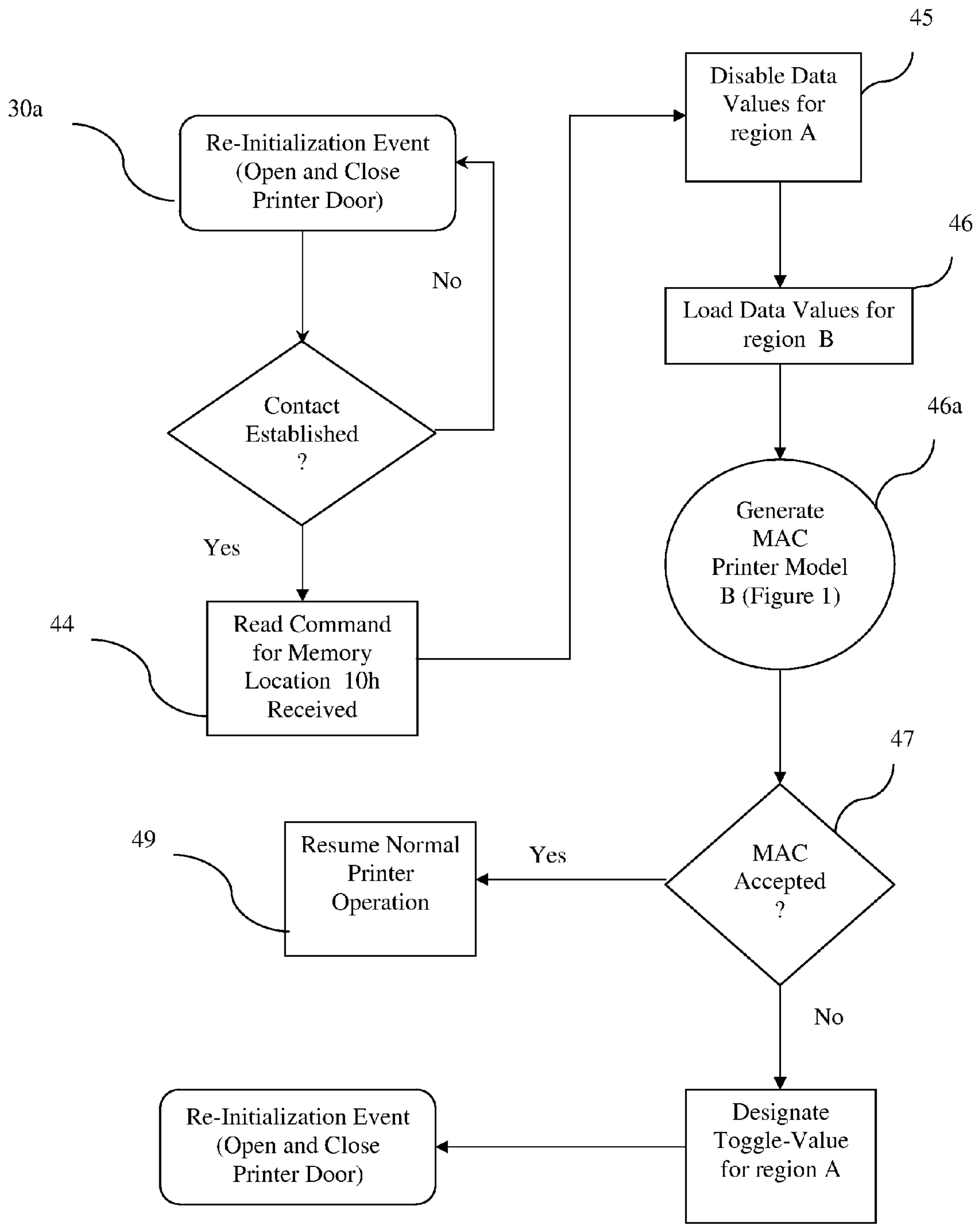
FIG. 4 is a continuation of FIG. 3 a represents simplified block diagram of a second toggle-identification subroutine where printers in multiple geographic regions have similar communication patterns.

FIG. 4 illustrates the second toggle-identification subroutine activated after re-initialization event 30*a*. The processor for the printer in region B now requests data from memory location 00*h* 44 and the microcontroller again references the look-up table. The microcontroller then returns to region A but acknowledges the data value associated with the error code; thereby recognizing region A is not the correct region 45. The microcontroller then continues to reference the look-up table and recognizes the same communication pattern for region B 46. The microcontroller generates a MAC using the data values stored for region B 46*a*. The printer in region B generates an acceptable MAC, completing the authentication process 47. The authentication process completed, normal printer operations resume 49. While the foregoing examples relate to a scenario where two printers share a common identity parameter, this process is not limited by the number of printers that posses identical communication patterns.

The present invention envisions alternate embodiments with regard to the toggle-data value. In one embodiment the toggle-data value remains active thereby causing the microcontroller to continue transmitting data associated with region B until another error code is received. Alternatively, the toggle-data value can be permanent; thereby "locking" the cartridge to region B.

Communication-Timing Identification

As previously discussed, communication values vary between geographic regions since different printers in differing regions are equipped with different processors (having different clock speeds) and run different firmware. It is therefore possible to establish a look-up table cross-referencing a plurality of lapsed-time values ($\alpha T$) with various geographic regions. In another embodiment of the invention, the microcontroller identifies the region by measuring a lapsed-time value ($\alpha T$) defined as the time it takes for the printer to initiate communication after a start-up event.

Figure 5:
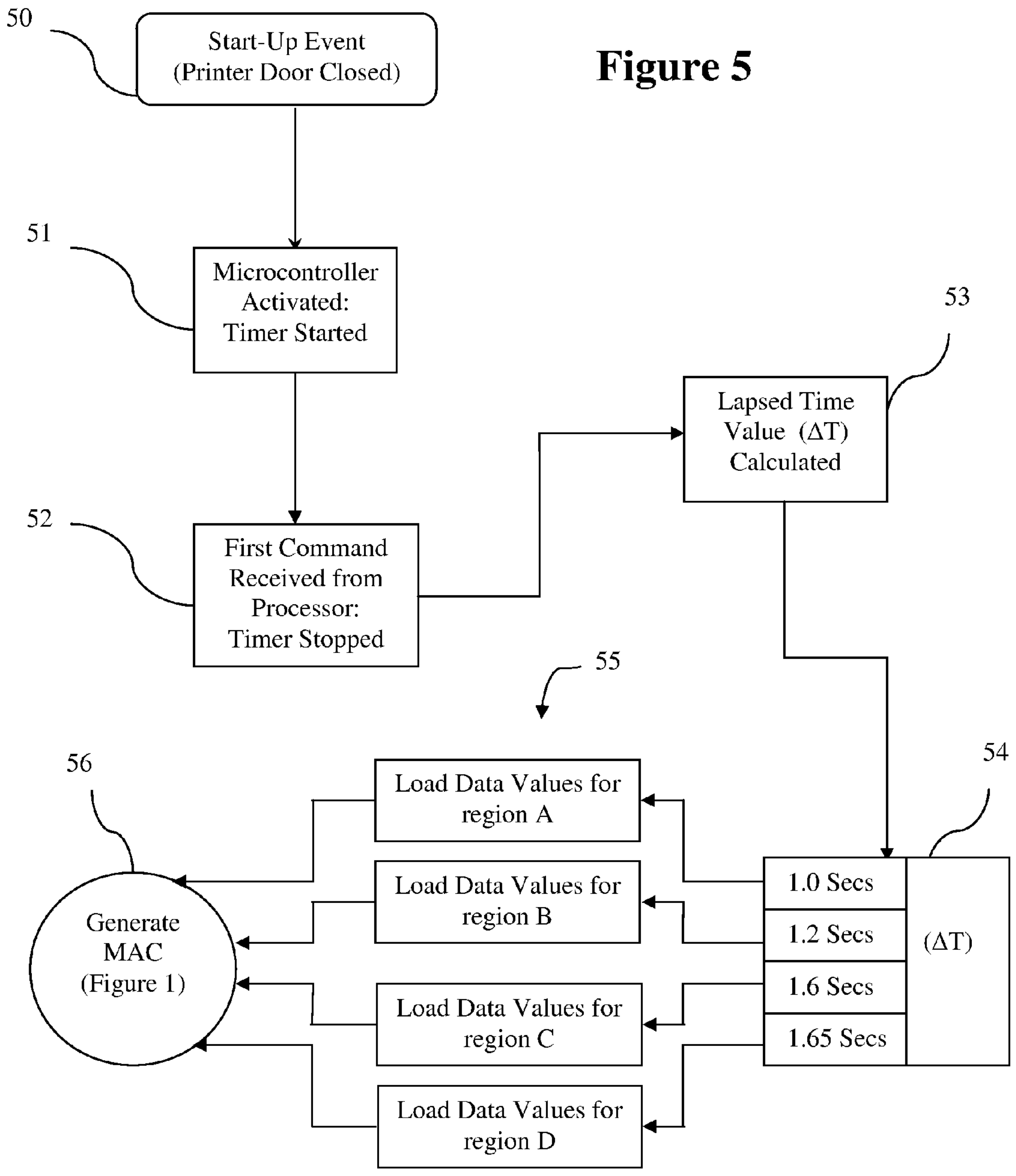
FIG. 5 is a simplified block diagram of a general embodiment of the present invention wherein the microcontroller monitors the time between initialization and the first communication received by the processor to identify the correct geographic region.

This embodiment is similar to the embodiment discussed above. As shown in FIG. 5, upon start-up event 50 the microcontroller is activated and a timer started 51. When the microcontroller receives the first command from the printer the timer is stopped 52 yielding a lapsed-time value ($\alpha T$) 53. Lapsed-time value ($\alpha T$) 53 is then compared to the values stored in look-up table 54 where it is matched to identify a geographic region. With the proper region identified, the correct data values 55 can be loaded into the SHA-1 engine and a model-specific MAC generated (FIG. 1) 56.

As with the communication-pattern identification embodiment, discussed above, it is possible for printers in more than one region to have the same lapsed-time value ($\alpha T$). A toggle-identification system, substantially similar to that described above (see FIGS. 3 and 4), provides multiple data values for generating the MAC, responsive to duplicate lapsed-time values ($\alpha T$).

Voltage-Value Identification

In still another embodiment, the microcontroller is capable of detecting different voltage levels received from the printer. As with the previous embodiment, different regions use different processors which produce different voltage values over time. A look-up table is established to identify the region as with the previous embodiments. The microcontroller receives the voltage level through the data connections with the processor. In one embodiment, the microcontroller converts the voltage level to a voltage value. Such conversion is facilitated by an analog-to-digital (A/D) conversion function found on many microcontrollers. Although the use of an (A/D) conversion function is discussed, any method known in the art of converting the voltage received from the processor to a data value is envisioned. Examples of methods of determining a voltage value between a printer and a cartridge in communication therewith include: U.S. Pat. No. 6,701,096 to Arai et al., U.S. Pat. No. 6,529,691 to Guy et al., U.S. Pat. No. 6,263,170 to Bortnem, and U.S. Pat. No. 6,104,888 to Kobayashi, which are incorporated herein by reference.

Figure 6:
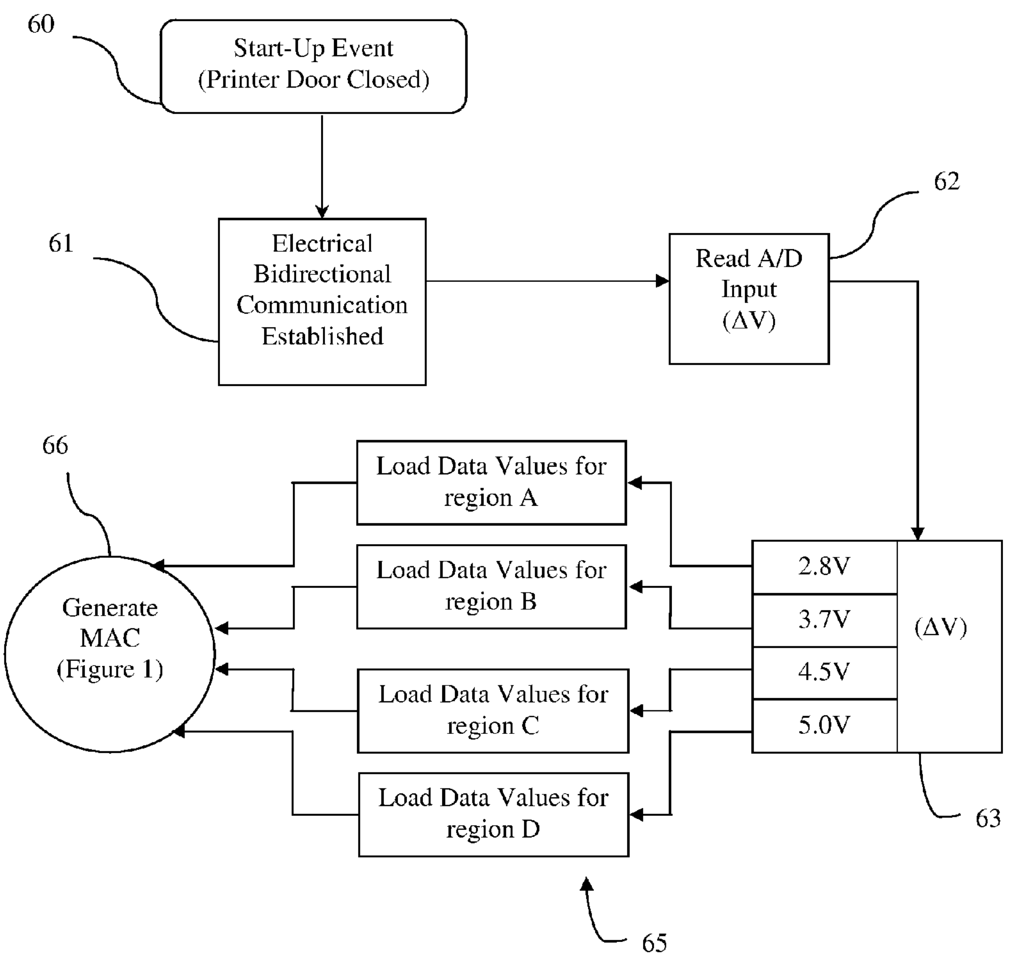
FIG. 6 is a simplified block diagram of a general embodiment of the present invention wherein the microcontroller monitors the voltage level generated by the processor to identify the correct geographic region.

FIG. 6 illustrates the program flow of the voltage recognition subroutine. Upon start-up event 60 the microcontroller makes electrical contact with the processor 61. The microcontroller receives voltage through the data connections with the processor. The microcontroller converts the voltage level to a voltage value ($\alpha V$) 62. Voltage value ($\alpha V$) is then compared to the values stored in look-up table 63 where it is matched to identify a geographic region. With the proper region identified, the correct data values 65 is loaded into the SHA-1 engine and a model-specific MAC is generated (FIG. 1) 66.

As with the previous embodiments, discussed above, it is possible for more than one region to yield the same voltage value ($\alpha V$). The toggle-identification system, substantially similar to that described above (see FIGS. 3 and 4), provides multiple data values for use in MAC generation, responsive to duplicate voltage values ($\alpha V$).

It is also possible to establish interoperation between the toner cartridge and printers used in a plurality of geographic regions without the use of lookup tables. In this embodiment, the microcontroller on the cartridge is associated with an authentication code that is operable in multiple regions. In this embodiment, it is not necessary for the microcontroller to detect the geographic region of the printer. The universal authentication code is communicated regardless of the geographic region.

Communication between the cartridge and the printer, in all embodiments, can be established through physical contact, radio frequency transmission, or any means of communication known in the art.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of communicating a message authentication code for a toner cartridge to a printer having a processor containing a lock-out algorithm, comprising the steps of:

providing a toner cartridge having a microcontroller in bidirectional communication with said processor when the cartridge is installed in the printer;

establishing a look-up table defining a plurality of processor-command algorithms associated with a plurality of geographic regions;

recognizing a communication pattern originated by the processor of the printer;

identifying at least one geographic region by matching the communication pattern from the processor of the printer to a processor-command algorithm defined on the look-up table;

generating a message authentication code associated with the identified geographic region of the printer; and transmitting the message authentication code to the processor.

2. The method of claim 1 further comprising the step of storing at least one data value associated with a toner cartridge status parameter on the microcontroller.

3. The method of claim 2 where at least one data value stored on the microcontroller is selected from the group consisting of a serial number associated with the microcontroller, a secret code, and a ROM ID.

4. The method of claim 2 where the message authentication code is generated using at least one data value stored on the microcontroller.

5. The method of claim 2 where the message authentication code is generated using at least one data value stored on the microcontroller and a challenge code initiated by the processor.

6. The method of claim 5 where the message authentication code is generated by a SHA-1 (Secure Hash Algorithm) engine.

7. The method of claim 1 where the message authentication code is generated using a SHA-1 (Secure Hash Algorithm) engine.

8. The method of claim 1 where the bidirectional communication between the microcontroller and the processor is established through a single wire bus architecture protocol.

9. The method of claim 1 further comprising the steps of:

generating a subsequent message authentication code associated with the identified geographic region of the printer responsive to an error condition generated by the processor; and transmitting the subsequent message authentication code to the processor.

10. A method of communicating a message authentication code for a toner cartridge to a printer having a processor containing a lock-out algorithm, comprising the steps of:

providing a toner cartridge having a microcontroller in bidirectional communication with said processor when the cartridge is installed in the printer;

establishing a look-up table defining a plurality of lapsed-time values associated with a plurality of geographic regions;

establishing an initial time value responsive to the activation of the microcontroller;

establishing a final time value responsive to a predetermined communication from the processor to the microcontroller;

subtracting the initial time value from the final time value to establish an identification value associated with a printer;

identifying at least geographic region by matching the identification value to a lapsed-time value defined on the look-up table;

generating a message authentication code associated with the identified printer; and transmitting the message authentication code to the processor.

11. The method of claim 10 further comprising the step of storing at least one data value associated with a toner cartridge status parameter on the microcontroller.

12. The method of claim 11 where at least one data value stored on the microcontroller is selected from the group consisting of a serial number associated with the microcontroller, a secret code, and a ROM ID.

13. The method of claim 11 where the message authentication code is generated using at least one data value stored on the microcontroller.

14. The method of claim 11 where the message authentication code is generated using at least one data value stored on the microcontroller and a challenge code initiated by the processor.

15. The method of claim 14 where the message authentication code is generated by a SHA-1 (Secure Hash Algorithm) engine.

16. The method of claim 10 where the message authentication code is generated using a SHA-1 (Secure Flash Algorithm) engine.

17. The method of claim 10 where the bidirectional communication between the microcontroller and the processor is established through a single wire bus architecture protocol.

18. The method of claim 10 further comprising the steps of:

generating a subsequent message authentication code associated with the identified geographic region of the printer responsive to an error condition generated by the processor; and transmitting the subsequent message authentication code to the processor.

19. A method of communicating a message authentication code for a toner cartridge to a printer having a processor containing a lock-out algorithm, comprising the steps of:

providing a toner cartridge having a microcontroller in bidirectional communication with said processor when the cartridge is installed in the printer;

establishing a look-up table defining a first voltage value associated with a plurality of geographic regions;

establishing a second voltage value by measuring the voltage at a point of contact between the microcontroller and the printer;

identifying at least one geographic region by matching the second voltage value to a first voltage value defined on the look-up table;

generating a message authentication code associated with the identified printer; and transmitting the message authentication code to the processor.

20. The method of claim 19 further comprising the step of storing at least one data value associated with a toner cartridge status parameter on the microcontroller.

21. The method of claim 20 where at least one data value stored on the microcontroller is selected from the group consisting of a serial number associated with the microcontroller, a secret code, and a ROM ID.

22. The method of claim 20 where the message authentication code is generated using at least one data value stored on the microcontroller.

23. The method of claim 20 where the message authentication code is generated using at least one data value stored on the microcontroller and a challenge code initiated by the processor.

24. The method of claim 23 where the message authentication code is generated by a SHA-1 (Secure Hash Algorithm) engine.

25. The method of claim 19 where the message authentication code is generated using a SHA-1 (Secure Hash Algorithm) engine.

26. The method of claim 19 where the bidirectional communication between the microcontroller and the processor is established through a single wire bus architecture protocol.

27. The method of claim 19 further comprising the steps of:

generating a subsequent message authentication code associated with the identified geographic region of the printer responsive to an error condition generated by the processor; and transmitting the subsequent message authentication code to the processor.

28. A method of communicating an authentication code for a toner cartridge to a printer, comprising the steps of:

providing a toner cartridge having a microcontroller in bidirectional communication with said printer when the cartridge is installed in the printer;

providing an authentication code adapted for interoperation with printers in a plurality of geographic regions in association with the microcontroller; and transmitting the authentication code to the processor.

* * * * *